Nov. 23, 1943.  A. M. PERKINS  2,334,725
CALCULATING INSTRUMENT
Filed Nov. 23, 1938  4 Sheets-Sheet 1
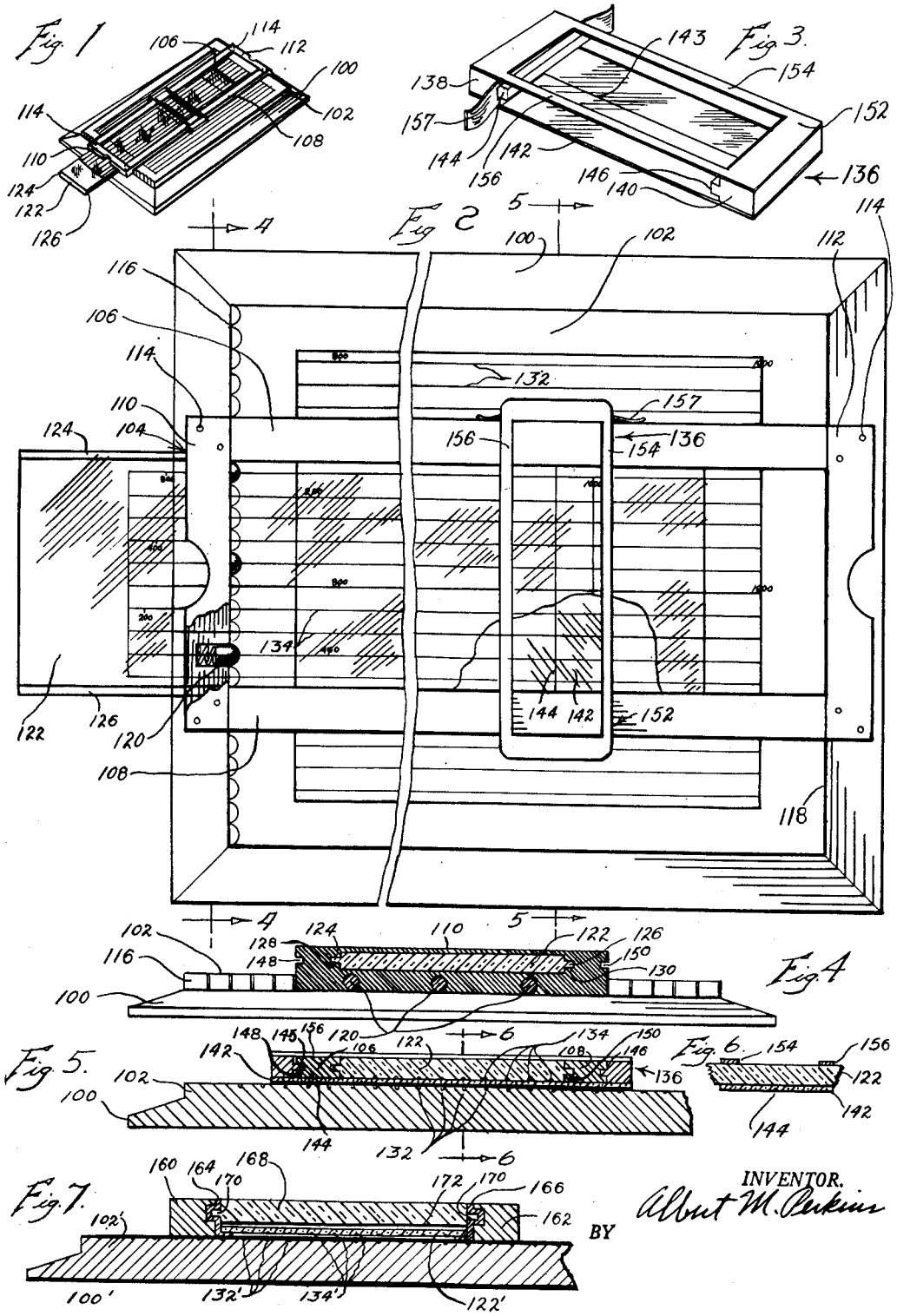
INVENTOR.
Albert M. Perkins
BY

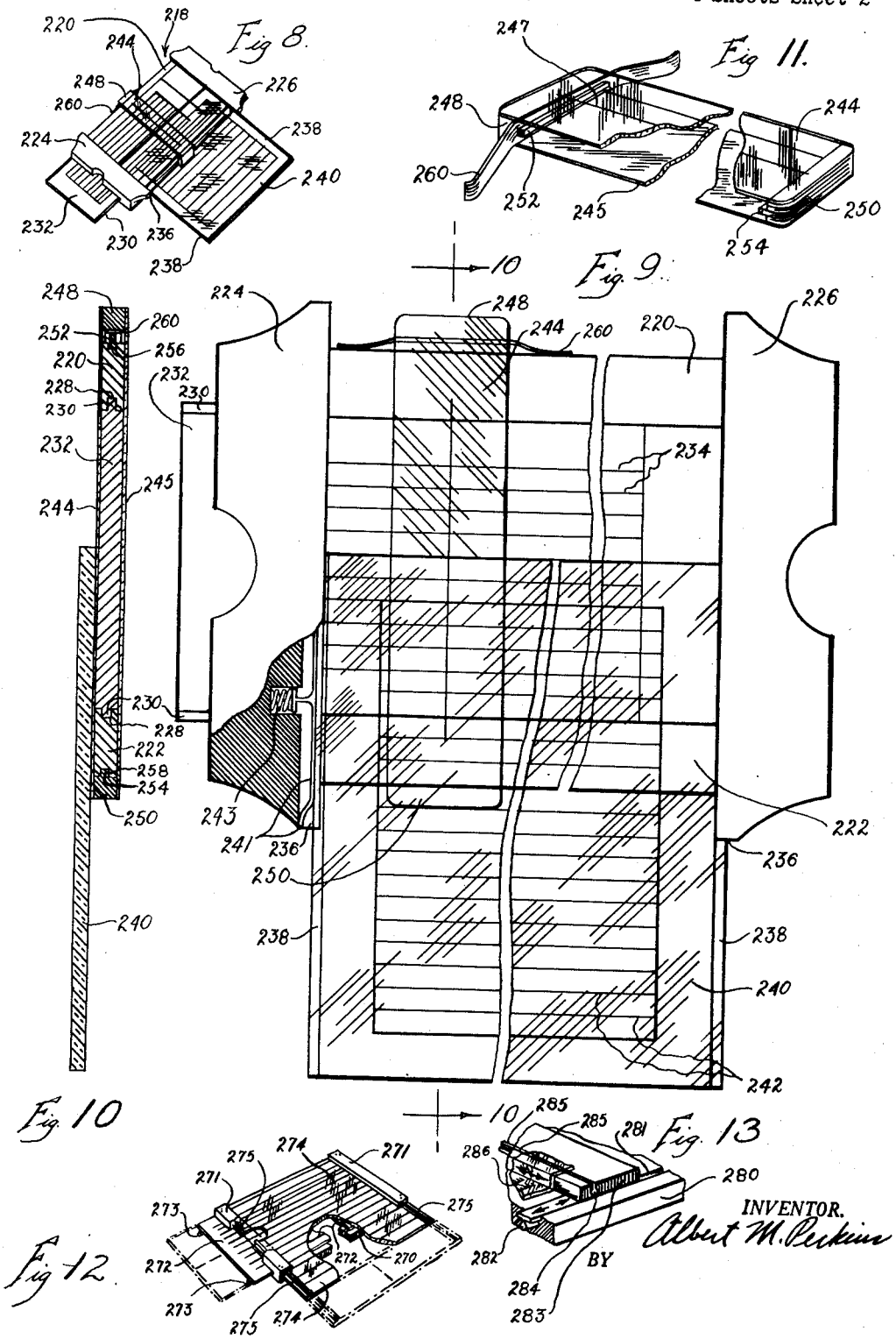

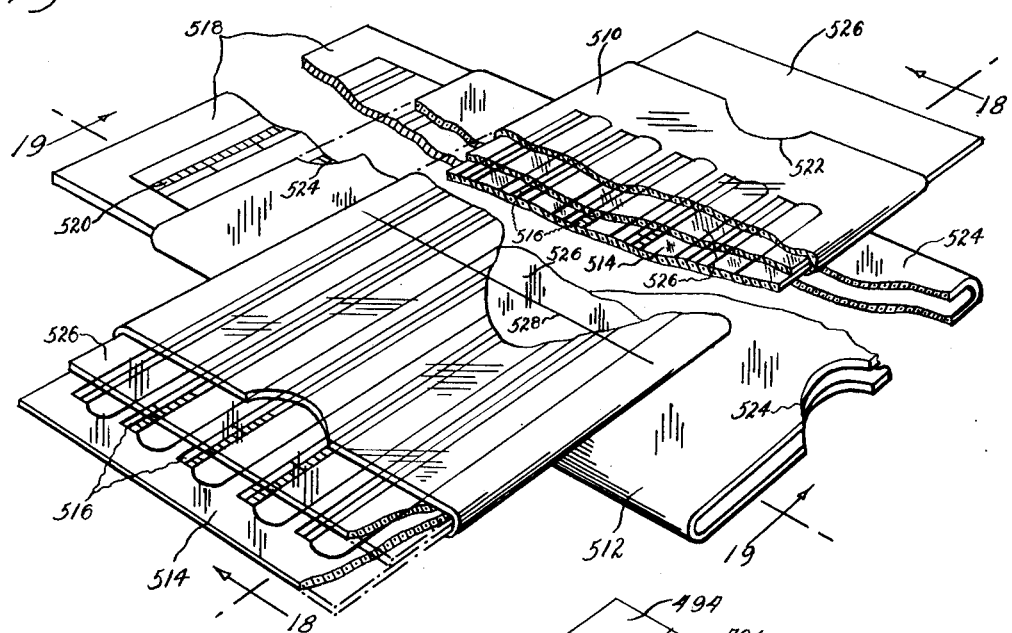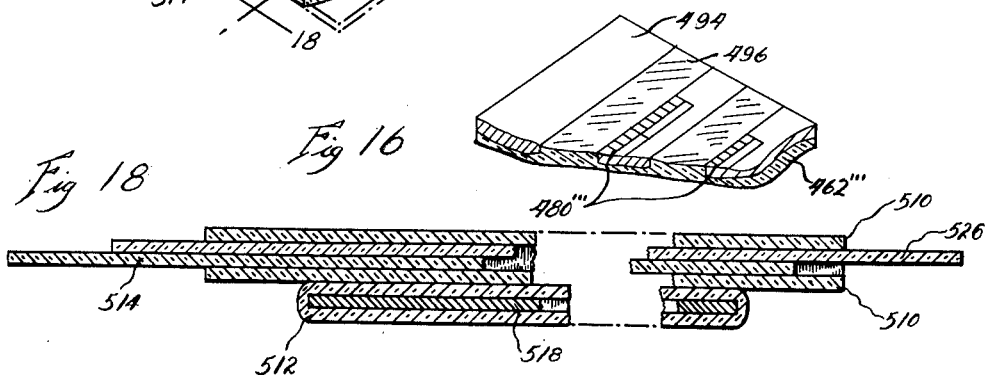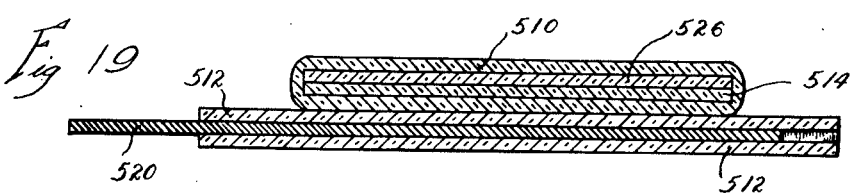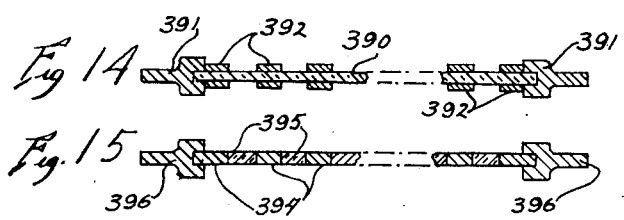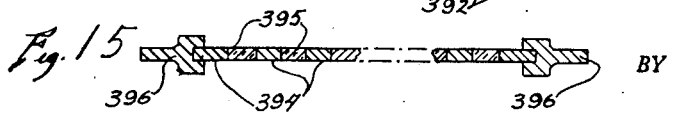

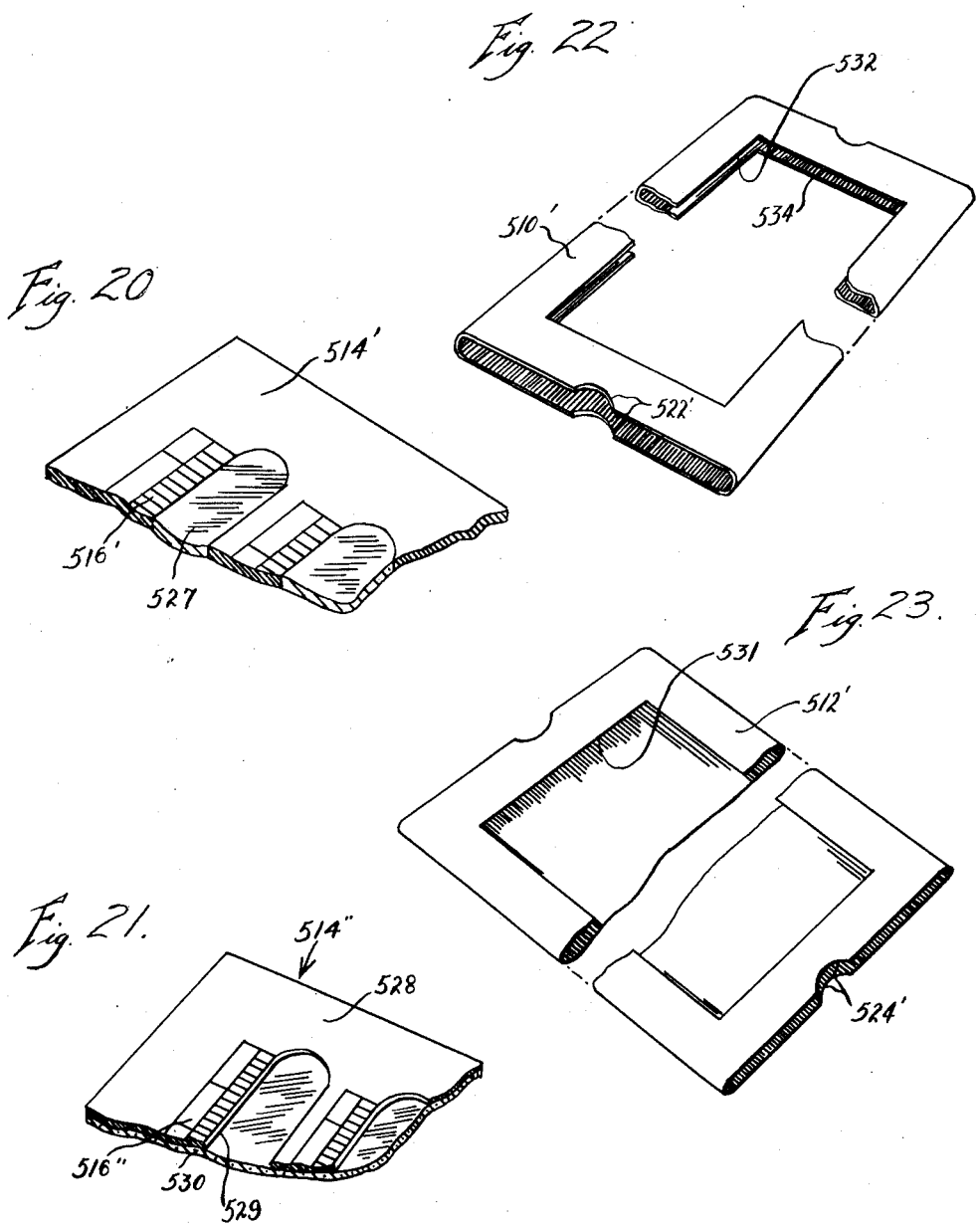

Patented Nov. 23, 1943

2,334,725

UNITED STATES PATENT OFFICE 2,334,725

CALCULATING INSTRUMENT

Albert M. Perkins, Pittsburgh, Pa.

Application November 23, 1938, Serial No. 241,968

13 Claims. (Cl. 235—70)

My invention relates to improvements in calculating instruments in which one or more movable scales operate over another scale or system of scales constructed upon the basis of logarithmic computations.

More particularly my invention relates to calculating instruments of the slide rule type, in which two members are movable relatively to each other in two angularly related directions.

The general object of my invention is the provision of a simple, effective and economical calculating instrument of the type mentioned.

Among the more particular objects of my invention is the provision of a calculating instrument of the slide rule type in which a pair of slides are mounted for movement in a member provided with a pair of angularly related guideways, so that the slides are angularly movable relatively to each other, and further the provision of a calculating instrument of this type in which each slide is provided with a scale that is divided into aliquot parallel sections, these sections always remaining parallel to each other during all relative positions of the slides.

Among the more particular objects of my invention is further a novel slide construction in which the slide is composed of transparent and opaque portions, and more specifically in which opaque material is imbedded in transparent material so as to form an integrated structure.

I attain these objects, and such other objects as will hereinafter appear or be pointed out, in the illustrative embodiments of my invention shown in the accompanying drawings, in which:

Figure 1 is a perspective view of one embodiment of my invention;

Figure 2 is a fragmentary plan view on an enlarged scale of the embodiment of Figure 1 with portions broken away to disclose the interior construction;

Figure 3 is a perspective view of the runner of the embodiment of Figure 1;

Figure 4 is a transverse sectional view substantially on the line 4—4 of Figure 2, looking in the direction of the arrows, and the runner being omitted;

Figure 5 is a fragmentary transverse sectional view substantially on the line of 5—5 of Figure 2, looking in the direction of the arrows;

Figure 6 is a sectional view substantially on the line 6—6 of Figure 5 looking in the direction of the arrows and the base being omitted;

Figure 7 is a view similar to Figure 5 showing a modified form of the embodiment of Figure 1;

Figure 8 is a perspective view of a further embodiment of my invention;

Figure 9 is a fragmentary plan view, on an enlarged scale, of the embodiment of Figure 8, portions being broken away to clearly disclose the underlying construction;

Figure 10 is a sectional view substantially on the line 10—10 of Figure 9, looking in the direction of the arrows;

Figure 11 is a view in perspective of the runner or cursor of the embodiment of Figure 8, portions being broken away to disclose the underlying construction;

Figure 12 is a fragmentary perspective view showing a modified form of the embodiment of Figure 8;

Figure 13 is a fragmentary perspective view of a further modification;

Figure 14 is a fragmentary sectional view through a modified slide member adapted for use with one of the embodiments of my invention;

Figure 15 is a view similar to Figure 14 of another modified slide;

Figure 16 is a fragmentary perspective view of another form of slide;

Figure 17 is a perspective view of a further embodiment of my invention;

Figure 18 is a sectional view substantially on the line 18—18 of Figure 17, looking in the direction of the arrows;

Figure 19 is a sectional view substantially on the line 19—19 of Figure 17, looking in the direction of the arrows;

Figure 20 is a fragmentary view in perspective of a constructional detail of the embodiment of Figure 17;

Figure 21 is a view similar to Figure 20 showing a modification; and

Figures 22 and 23 are modified forms of constructional details of the embodiment of Figure 17.

Reference will now be had to the drawings for a detailed disclosure of the invention.

In the embodiment of my invention illustrated in Figures 1 to 6 inclusive the numeral 100 designates a base shown as provided with a raised portion 102. Slidably mounted on the base 100 is a frame designated generally by the number 104, and shown as comprising a pair of longitudinal members 106 and 108 and a pair of transverse members 110 and 112, and these members are secured together in any suitable or preferred manner, such as by the pins 114. The frame is so proportioned that its end members 110 and 112 are in sliding contact with the edges 116 and 118 of the raised portion 102 of the base. The edge 116 is shown as corrugated or scalloped, and into the hollow portions of this scalloped or corrugated edge are adapted to project plugs 120 urged thereinto by springs 121. The plugs 120 and springs 121 are conveniently positioned in recesses within the member 110. By means of this arrangement it will be observed that the frame 104 may be slid across the base 100 and will be releasably locked in position by the aforementioned plugs 120. Frame 104 may be shifted in position merely by exerting sufficient pressure thereon to force the plugs 120 inwardly, after which they will enter other ones of the hollow portions of the scalloped edge 116.

On the upper surface of the raised portion 102 of the base 104 I have shown graduated scales 132 which are sections of a logarithmic scale.

Slidably carried within the frame 104 is a member 122 that will be referred to hereinafter as the slide, and this member is shown as provided with laterally projecting tongues 124 and 126 adapted to fit into complementary grooves 128 and 130 in the frame members 106 and 108 respectively. The frame members 110 and 112 are provided with suitable openings to permit the free passage therethrough of the slide 122 (see Figure 4).

The slide 122 is shown as of transparent material so that the scales 132 may be clearly seen therethrough, and as provided with a series of graduated scales 134 of such character that they may be used in conjunction with the scales 132 for logarithmic computations.

It will be observed that whereas ten scales 134 are shown on the slide 122 that the base is shown as carrying twenty scales 132. Whereas the scales 134 constitute a single logarithmic scale, the scales 132 constitute two such logarithmic scales each similar to the set of scales 134. By this arrangement which involves duplication of the scales I am enabled to greatly add to the convenience in use of the instrument.

It will now be understood that by sliding the frame 104 transversely to the base 100 and the slide 122 longitudinally in the frame 104 and also longitudinally relatively to the base 100, logarithmic computations may be carried out in accordance with the well understood principles of the slide rule. That is to say, multiplicational operations are performed by the addition of distances corresponding to the logarithms of the numbers it is desired to multiply, and divisional operations are performed by subtracting such distances. Whereas, however, in the ordinary slide rule the graduated scales are moved linearly relatively to each other in one direction, in my improved calculating device, in addition to relative sliding in one direction only, relative movement in at least one other direction is availed of to bring the various sections of the complete scales into selective registration.

The principles mentioned herein, on which my invention is based, are equally applicable to calculations such as those relating to powers and roots, fractional and decimal exponents, and ratios and proportions, and it will be understood that where these computations are to be performed on my calculating device that appropriate scales for that purpose will be provided thereon.

For the purpose of illustrating the process of multiplication I will select the problem of finding the product of the number 2 multiplied by the number 3. The first step would be to locate the number 2 on one of the scales, and the number 1, (that is, the zero point) of the second scale is then brought into coincidence with the number 2 of the first scale. The answer to the problem will be found on the first scale, and will be the number thereon that is in coincidence with the number 3 on the second scale, which of course is 6 on the first scale. It is to be noted that whereas in the conventional slide rule all these numbers are linearly aligned, in my improved slide rule one pair of coincident numbers may be positioned on one section of the composite sectional logarithmic scale, while the other pair will be located on another section thereof.

The operation of division involves a subtraction of distances instead of an addition. For instance, assuming that the problem is to find the quotient of the number 6 divided by the number 3, the answer would be found by bringing into coincidence the number 6 on one scale and the number 3 on the other scale. The answer is to be found on the first-mentioned scale opposite the 1 or initial point of the second-mentioned scale.

For the purpose of facilitating computations I have also provided a runner or cursor, indicated as a whole by the numeral 136, and comprising a pair of end pieces 138 and 140, across which is laid a transparent piece 142 provided with a hair line 144. The end pieces 138 and 140 are shown as provided with tongues 145 and 146 which fit into complementary grooves 148 and 150 in the members 106 and 108 of the frame 104, so as to permit sliding of the end pieces therein. The transparent cross piece 142 of the runner 136 is shown as passing underneath the slide 122, and to provide the necessary space to permit this the mounting of the slide 122 is so arranged that it is spaced from the upper surface of the raised portion 102 of the base 100, as clearly appears from Figure 5.

In order to permit of the transparent cross piece 142 being made extremely thin, which is desirable for a purpose that will presently appear, I may provide a second cross piece 152 overlying the end pieces 138 and 140 and comprising a pair of spaced side members 154 and 156 leaving an opening or window between them through which the scales 134 and 132 may be viewed. The member 152 is made of material having sufficient strength and rigidity to provide the desired support for the runner, and it may be made, although not necessarily so, of opaque material.

For the purpose of taking up lost motion I may provide means such as a leaf spring 157 that is shown as interposed between one end member 138 of the runner and the slide of the frame member 106. By this means the desired ends will be attained without interfering with the free sliding movement of the runner.

The construction that has just been described for the runner or cursor enables the use of a very thin transparent piece 142 for the runner, and this is of great advantage in accuracy of reading when it is remembered that such accuracy may be seriously affected by parallax incident to reading graduations spaced from each other by the thickness of a thick sheet of material. This accuracy is further affected by distortion due to refraction in a thick sheet of transparent material. For this reason it is desirable that all superposed markings or graduations be as close together as possible so that parallax is minimized, and if any distortion is present it will affect all these markings and graduations to an equal degree. When however such markings and graduations are closely adjacent, it is possible to interpose a comparatively thick sheet of refracting material therebetween and the eye, without affecting the accuracy of the reading.

In Figures 4 and 6 I have indicated the graduations 134 as positioned on the bottom surface of the slide 122, and the hair line 144 as on the bottom surface of the transparent cross member 142 of the runner. In this manner the hair line 144 is brought into immediate adjacency to the graduations 132 on the upper surface of the base 100, while the graduations 134 are spaced from the hair line and from the graduations 132 merely by the thickness of the transparent runner portion 142. Since the latter, as a result of the construction described hereinabove, may be made extremely thin, the conditions for accurate reading are fulfilled. It therefore follows that even though the slide 122 is made of substantial thickness, as shown, the accuracy of the reading will not be interfered with.

In Figure 7 I have shown a similar result attained in a construction in which the runner is of thick material while the member corresponding to the slide is of very thin material. In this figure parts similar to those of the embodiment just described have been similarly numbered, but the numerals have been primed. The frame members 106 and 108 have been replaced by a pair of members 160 and 162, each grooved on its inner side so as to accommodate therein, respectively in slidable relation, frame members 164 and 166, constituting the side portions of a rigid frame which carries at its lower end a thin transparent slide 122' provided with graduations 134' on the lower surface thereof.

It will be understood that the member 122' has its lower surface positioned as closely as possible to the upper surface of the raised portion 102' of the base 100' and that for this purpose the frame of which members 164 and 166 constitute a portion, is made sufficiently thin at appropriate portions thereof.

The runner 168 is shown as in the form of a relatively thick sheet of transparent material slidably mounted in the frame members 164 and 166, as by tongues 170 thereon fitting into complementary grooves in these frame members. Its lower surface, which is closely adjacent to the upper surface of the thin slide 122' is shown as provided with a hair line 172.

It will therefore be observed that in spite of the thickness of the runner 168, accuracy of reading is again attained because of the relatively close adjacency of the hair line 172 and the graduations 132' and 134', the amount of separation being substantially no more than the thickness of the slide 122'. In view of the fact that the slide 122' is supported in the rigid frame of which members 164 and 166 constitute a portion, its thickness, with the variety of transparent materials available at the present day, may be very slight.

As an additional feature of my invention I may make the transparent scale reversible. By so doing I am enabled to provide a different type of scale on the reverse of the slide and thereby add to the variety of calculations that may be performed on the instrument. For example, the reverse side of the slide may carry a scale adapted for cooperation with the lower scale for the direct reading of squares or of square roots.

The operation of this embodiment of my invention requires no detailed description, since it is similar to that of the first embodiment, and involves relative movement of the two scales in a manner similar to that explained.

Referring now to Figures 8 to 11 inclusive for a detailed disclosure of a further embodiment of my invention, I have shown in these figures a frame 218 comprising a pair of longitudinally extending members 220 and 222, and a pair of transverse members, 224 and 226. The members 220 and 222 are shown as provided with grooves 228 on their inner sides, and into these grooves extend in slidable relation thereto, tongues 230 carried by a slide 232, which is thereby adapted to move longitudinally in relation to the aforementioned frame. The slide 232 is shown as provided on the face thereof with graduated scales 234 arranged in parallel lines and constituting portions of a logarithmic scale of a character similar to those already mentioned hereinabove, the scale being shown as divided into ten sections.

The transverse frame members 224 and 226 are provided on their inner sides with grooves 236, and into these grooves extend in slidable relation the tongues 238 carried by a second slide 240, which is made of transparent material so that the graduations 234 of the slide 232 are readily visible therethrough.

In order to take up lost motion between the sliding members 240 and the frame members 224 and 226, I have shown an arrangement comprising an elongated member 241 adapted to bear against one of the tongues 238 and the member 240 and urged thereagainst by resilient means, such as the coil springs 243, indicated in Figure 9, which are positioned in suitable recesses within the frame member 224.

The member 240 has graduated scales 242 thereon also arranged in parallel lines, and it will be observed that the graduated scales 234 extend parallel to the graduated scales 232, and, further, that by sliding the member 240, any desired scale line 242 may be brought into superimposed registration with any desired scale line 234. By moving the slide 232 the relative position of the superposed graduations 234 and 242 may be altered in a longitudinal direction.

The graduated scales 242 form a logarithmic scale that is proportioned in relation to the graduated scales 234 so as to make possible computation according to the well known principles used in slide rules.

The slide 232 may be made of any suitable or preferred material. I have found in practice that the efficiency of my improved slide rule may be greatly increased by making the slide 232 of transparent material, and further by making it of the same material as the member 240 so that the slide 232 and the member 240 will have substantially the same coefficient of expansion, whereby similarity in their graduations is assured under varying conditions. The advantages thereof, and particularly of the use of the same material for both the slide 232 and the member 240 have already been fully discussed in connection with the first embodiment.

By referring to Figure 10 it will be observed that a runner comprising end members 248 and 250 and transverse members 244 and 245 is shown as slidably mounted on the side members 220 and 222 of the frame. The transverse member 244, which is shown as transparent and as provided with a hair line 247 is positioned between the slide 232 and the transparent member 240, and for this purpose the slide 240 is mounted in slightly spaced relation to the slide 232, the spacing being sufficient to permit sliding of the runner but being sufficiently restricted so that the scale graduations on the slide 232 and on the lower surface of the transparent member 240 are sufficiently close to the hair line 247 to prevent parallax and distortion, as has already been explained in connection with the previous embodiment. Where the slide 232 is provided with graduations on its reverse side, the transverse member 245 of the runner may also be made transparent and be provided with a hair line.

The mounting of the runner may comprise inwardly directed tongues 252 and 254 provided on its respective end pieces, which tongues fit respectively into grooves 256 and 258 in the side frame members 220 and 222. A leaf spring 260 may further be provided on one of the ends of the runner so mounted as to press on the outer side of the frame member 220 and thereby take up lost motion between the runner and the frame.

It is to be understood that the various features and refinements mentioned in connection with the preceding embodiments may, if desired, be used in connection with this embodiment.

The operation of the device just described will be understood from what has already been said about the operation of the preceding embodiment.

In the form of my invention illustrated in Figure 12 I have shown a rectangular frame comprising a lower portion 270 and a pair of members 271 laid thereover. Slidably mounted within said frame is shown a flat piece 272 provided with graduated scales and having on the lower edge portions thereof rails or ribs 273 slidable in complementary channels or grooves provided for that purpose in the frame portion 270. A second flat piece 274 provided with graduations complementary to those of the piece 272 is mounted for sliding movement in the frame transversely to the movement of the piece 272. For this purpose it may be provided with rails or ribs 275 mounted to slide in complementary channels provided for that purpose in the frame members 271.

The rails 273 and 275, it will be observed, are shown as of a cross section that will prevent movement thereof in the channels in any other direction than their length.

It will further be observed that the piece 274 is transparent and that its lower surface is closely adjacent to the upper surface of the piece 272, so that by applying the graduations of the piece 274 on the lower surface thereof they will be sufficiently close to the graduations on the upper surface of the piece 272 to avoid the inaccuracies resulting from parallax when spacing between the graduations is too great.

While no runner has been shown, it will be evident that a runner such as shown in the embodiment of Figure 8 is well suited for use with this form of my invention.

In Figure 13 I have indicated another way in which relative slidability of two graduated members may be effected. In this figure, 280 designates a base, in the grooves 281 of which are slidably mounted a pair of bars or rails 282, only a portion of one of these bars being shown. Mounted transversely on these bars are members 283 provided with grooves 284 within which slide the frame pieces 285, carrying between them a transparent piece 286 provided with graduations adapted for cooperation with graduations on the base 280. For this purpose the lower graduated surface of the piece 286 is positioned in close adjacency to the upper graduated surface of the base 280.

In Figure 14 is shown a slide, suitable for use with my invention, and comprising a transparent piece 390 surrounded by a rigid frame 391. Portions of the piece 390 are rendered opaque as indicated at 392.

In Figure 15 the same effect is attained by making the slide of alternately arranged bands or strips of opaque and transparent material, the former being numbered 394 and the latter 395. The whole may be surrounded by a frame 396 for giving it greater rigidity.

In Figure 16 I have shown a further modification in which the slide 462''' is formed of a transparent sheet of material having strips of opaque material 494 sunk thereinto, the upper surfaces of the opaque strips being shown flush with the upper surface 496 of the slide 462''' although not necessarily so. The graduations 480''' are formed on the opaque portions 494.

On viewing Figures 17 to 19 it will be observed that the embodiment therein shown comprises a transparent sleeve or envelope 510 open at both ends, and secured thereto but in a position displaced through a right angle is a second transparent sleeve or envelope 512. Slidable within the sleeve 510 is shown a slide 514 of transparent sheet material and having graduations 516 thereon, these graduations extending longitudinally to the direction of sliding. Slidably mounted in the envelope 512 is a second slide 518 having graduations 520 thereon. The graduations 520 of this slide extend in a direction transverse to the direction of sliding movement thereof and in a direction parallel to the graduations 516 of the slide 514. In order to facilitate handling of the slides 514 and 518 I have shown the envelopes 510 and 512 provided with cut out portions 522 and 524, respectively, so located thereon that the slides are accessible to the thumbs and fingers of the manipulator no matter what their position. In view of the fact that the envelopes 510 and 512 as well as the slide 514 are transparent it will be obvious that the graduations of the slide 518 are readily visible through the various surfaces of the envelopes and the slide 514 that are interposed between it and the eye of the manipulator. The operation of this device will be readily understood without further description, in view of the detailed explanations given hereinabove in connection with other forms of my invention.

As an added feature I have shown a runner or cursor in the form of a transparent sheet 526 provided with a hair line 528 and slidable within the envelope 510. The runner 526 is shown as superposed over the slide 514 and may be manipulated independently of the slide 514.

It will be observed that the slide 514 is shown as of greater length than the sleeve 510, and, similarly, the slide 520 is shown as longer than the sleeve 512. The advantages of this construction as affording convenience in manipulation will be readily appreciated. It will further be observed that for similar reasons the cursor 526 is shown longer than the slide 514 as well as the sleeve 510.

This form of my invention adapts itself readily to manufacture out of thin sheet material, and, where it is desired to produce it at very low cost, transparent paper is well suited for the envelopes and the transparent slides, while cardboard may be used for the slide 518. The thinness of the paper for the superposed transparent portions is an obvious advantage in securing accuracy of reading, as has already been explained.

Among other suitable materials may be mentioned celluloid and cellulose acetate.

In Figure 20 I have shown a modified construction that may be used in place of the transparent slide 514 of the embodiment of Figure 17. In this figure the slide 514' is shown as of opaque material with windows 527 formed at intervals therein through which the graduations 520 of the slide 518 may be seen. The graduations 516' would preferably be positioned on the opaque portion of the slide 514', so as to be more readily visible. As a practical matter a slide of this type may be produced according to the principle used in one well known type of window envelope, that is the slide 514' might consist of a single piece of paper, opaque throughout except for the portions 527 which are made transparent by suitable treatment.

A further modification is shown in Figure 21, in which the opaque slide 514", adapted to take the place of slide 514 of Figure 17, has slots 529 formed in a sheet of opaque material which are then covered over with transparent sheet material. Such transparent sheet material may comprise a single sheet 530 forming a backing for the slide 514", or an individual strip of transparent sheet material might be secured over each opening. The graduations 516" are again preferably applied to the opaque portions of the slide 514".

In Figures 22 and 23 I have shown modified forms of envelopes such as might be used in the embodiment of Figure 17. Parts of this figure that are similar to parts of Figure 17 have been similarly numbered, with the numerals primed.

In Figure 22 I have shown an envelope 510' and in Figure 23 an envelope 512', and it is to be understood that these envelopes are intended to be secured together in any suitable or preferred manner in superposed relation as are the envelopes 510 and 512. Whereas, however, the latter were described and shown as being of transparent material, the envelopes 510' and 512' need not of necessity be made of transparent material. In order to secure visibility of the graduated markings on the slide 518, which would be mounted in the envelope 512', the latter is provided with a window or opening 531 in its upper face, and the envelope 510' is provided with windows or openings 532, 534 on its upper and lower faces respectively. When the envelopes 510' and 512' are assembled in superposed relation these windows or sufficient portions thereof as will make the slide 518 visible will be in registering superposed relation. When therefore the transparent slide 514 of Figure 17 is introduced into the envelope 510' the graduations on the lower slide 518 will be visible therethrough and through the windows 531, 532 and 534.

While I have herein disclosed several illustrative embodiments of my invention and explained the manner of their use, it will be understood that my invention may be embodied in many other forms without departing from the spirit thereof, as will be obvious to those skilled in the art, and that the disclosure herein is by way of illustration merely, and is not to be interpreted in a limiting sense, and that I do not limit myself other than as called for by the prior art.

Having thus described my invention and the manner of its use, what I desire to claim and secure by Letters Patent is:

1. In a logarithmic calculator a member provided with a pair of guideways arranged at right angles to each other, a slide arranged for sliding movement in each of said guideways, one of said slides carrying a logarithmic scale divided into aliquot sections arranged parallel to each other, and the other slide carrying a similar logarithmic scale also divided into aliquot sections arranged parallel to each other, the scale sections of said second slide being disposed parallel to the scale sections of said first slide, said scales being of a character for coaction in performing logarithmic computations, said guideways being positioned so that the slides therein may have portions of one slide superposed over portions of the other in relatively close adjacency, one of said slides being transparent, and said member presenting no visual obstruction preventing a view through said transparent slide of those portions of the other slide that are in registration with portions of the first slide.

2. In a calculating device a main member, a pair of slides, a mounting for each of said slides in said main member whereby it may slide therein in a direction at an angle to the other slide and whereby portions of one slide may be superposed on the other, graduated scales on each of said slides, said slides being similar in size and one of said slides being transparent, and said main member being free of visual obstructions preventing the reading through said transparent slide of the graduated scales of said other slide on the portions thereof that are in registration with said transparent slide.

3. A calculating device comprising a main member, a pair of slides, a mounting for each of said slides in said main member whereby they may slide therein in a direction at an angle to one another and whereby portions of one slide may be superposed on the other, graduated scales on each of said slides, one of said slides being transparent, and said main member being free of visual obstructions preventing the reading through said transparent slide of the graduated scales of said other slide on the portions thereof that are in registration with said transparent slide.

4. A logarithmic calculator comprising a guideway, a slide having a logarithmic scale thereon mounted for sliding movement in said guideway, said logarithmic scale being divided into parallel sections running in the direction of movement of said slide, a transparent cursor mounted for sliding movement on said guideway in superposed adjacency to said slide, a pair of transverse members fixedly secured to said guideway in superposed spaced relation thereto, said members constituting a second guideway, and a transparent slide mounted for sliding movement in said second guideway, said transparent slide having a logarithmic scale thereon similar and arranged parallel to the logarithmic scale on said first slide.

5. In a logarithmic calculator of the type set forth in claim 1, a cursor provided with indicating means, and a mounting for said cursor whereby it is adapted for bodily sliding movement on said member, with its indicating means between said slides.

6. In a calculator of the character set forth in claim 3, a cursor mounted for sliding movement on said member, said cursor being provided with indicating means positioned between said slides.

7. In combination with a logarithmic calculator as set forth in claim 1, a cursor, a mounting for said cursor on said member whereby it is adapted for bodily sliding movement in a straight line relatively to said slides, and said cursor being provided with indicating means positioned between said slides.

8. In a calculator of the character set forth in claim 3, a cursor provided with indicating means, and a mounting for said cursor whereby its indicating means is adapted to slide rectilinearly between said slides.

9. A logarithmic calculator comprising a pair of flat rectangular transparent sleeves, each open at its ends and closed at its sides, said sleeves being secured to each other so as to overlie each other in crossed relationship and so that the open ends of one are at right angles to the open ends of the other, a transparent flat slide mounted for sliding movement in one of said sleeves, said slide being of a width so that its side edges will contact the sides of said sleeve and will be held against sidewise displacement thereby, said slide being of greater length than said sleeve, a plurality of parallel scale sections constituting together a logarithmic unit disposed on said slide, a second flat slide mounted for sliding movement in the other of said sleeves, a plurality of parallel scale sections constituting a logarithmic unit on said second slide adapted for use with the logarithmic unit of the other slide in making computations, said second slide being of such width that its side edges will contact the sides of said second sleeve and will be held against lateral movement thereby, said second slide being of greater length than said second sleeve, and a second transparent slide mounted for sliding movement in said first mentioned sleeve, and a transverse indicating line on said second transparent slide, said second transparent slide also being of a width so as to be held against lateral movement in said sleeve and being of greater length than said first mentioned transparent slide, whereby the scale on the slide in the second sleeve may be viewed through the two transparent slides in said first mentioned sleeve.

10. A calculating device comprising a pair of sleeves, each open at its ends and closed at its sides and secured to each other in a relatively angled relationship, a slide in each of said sleeves of a width to be held against lateral movement thereby, one of said slides being transparent, each slide bearing graduated scales thereon adapted for cooperation with the scales of the other slide, visually unobstructive portions in said sleeves so positioned that on looking through said transparent slide and through said visually unobstructive portions the graduated scales on the other slide may be seen.

11. A calculating device comprising a pair of sleeves, each open at its ends and closed at its sides and secured to each other in a relatively angled relationship, a slide in each of said sleeves of a width to be held against lateral movement thereby, one of said slides being transparent, each slide bearing graduated scales thereon adapted for cooperation with the scales of the other slide, and visually unobstructive portions in said sleeves so positioned that on looking through said transparent slide and through said visually unobstructive portions the graduated scales on the other slide may be seen, and a second transparent slide provided with indicating means thereon mounted for sliding in the sleeve in which the first transparent slide is mounted.

12. A logarithmic calculator comprising a pair of flat rectangular transparent sleeves, each open at its ends and closed at its sides, said sleeves being secured to each other so as to overlie each other in crossed relationship and so that the open ends of one are at right angles to the open ends of the other, a transparent flat slide mounted for sliding movement in one of said sleeves, said slide being of a width so that its side edges will contact the sides of said sleeve and will be held against sidewise displacement thereby, said slide being of greater length than said sleeve, a plurality of parallel scale sections constituting together a logarithmic unit disposed on said slide, a second flat slide mounted for sliding movement in the other of said sleeves, a plurality of parallel scale sections constituting a logarithmic unit on said second slide adapted for use with the logarithmic unit of the other slide in making computations on said second slide, said second slide being of such width that its side edges will contact the sides of said second sleeve and will be held against lateral movement thereby, and a second transparent slide mounted for sliding movement in said first mentioned sleeve, and a transverse indicating line on said second transparent slide, said second transparent slide also being of a width so as to be held against lateral movement in said sleeve whereby the scale on the slide in the second sleeve may be viewed through the two transparent slides in said first-mentioned sleeve.

13. A logarithmic calculator comprising a pair of flat rectangular transparent sleeves, each open at its ends and closed at its sides, said sleeves being secured to each other so as to overlie each other in crossed relationship and so that the open ends of one are at right angles to the open ends of the other, a transparent flat slide mounted for sliding movement in one of said sleeves, said slide being of a width so that its side edges will contact the sides of said sleeve and will be held against sidewise displacement thereby, said slide being of greater length than said sleeve, a plurality of parallel scale sections constituting together a logarithmic unit disposed on said slide, a second flat slide mounted for sliding movement in the other of said sleeves, a plurality of parallel scale sections constituting a logarithmic unit adapted for use with the logarithmic unit of the other slide in making computations on said second slide, said second slide being of such a width that its side edges will contact the sides of said second sleeve and will be held against lateral movement thereby, said second slide being of greater length than said second sleeve, and a second transparent slide mounted for sliding movement in said first-mentioned sleeve, and a transverse indicating line on said second transparent slide, said second transparent slide also being of a width so as to be held against lateral movement in said sleeve, whereby the scale on the slide in the second sleeve may be viewed through the two transparent slides in said first-mentioned sleeve.

ALBERT M. PERKINS.